(12) United States Patent
Wang (10) Patent No.: US 8,305,083 B2
(45) Date of Patent: *Nov. 6, 2012

(54) CALIBRATION METHOD FOR A MICRORESISTIVITY LOGGING TOOL

(75) Inventor: Tsili Wang, Katy, TX (US)

(73) Assignee: Smith International, Inc., Houston, TX (US)

( * ) Notice: Subject to any disclaimer, the term of this patent is extended or adjusted under 35 U.S.C. 154(b) by 326 days.

This patent is subject to a terminal disclaimer.

(21) Appl. No.: 12/649,982

(22) Filed: Dec. 30, 2009

(65) Prior Publication Data

US 2011/0156710 A1    Jun. 30, 2011

(51) Int. Cl.
*G01V 3/00* (2006.01)
*E21B 47/00* (2012.01)
(52) U.S. Cl. ............... 324/369; 324/370; 175/50
(58) Field of Classification Search .......... 324/366–375; 175/50
See application file for complete search history.

(56) References Cited

U.S. PATENT DOCUMENTS

| | | | |
|---|---|---|---|
| 4,594,552 A | 6/1986 | Grimaldi et al. | |
| 4,968,940 A * | 11/1990 | Clark et al. | 324/338 |
| 5,103,920 A * | 4/1992 | Patton | 175/45 |
| 5,235,285 A | 8/1993 | Clark et al. | |
| 5,339,037 A | 8/1994 | Bonner et al. | |
| 6,173,793 B1 | 1/2001 | Thompson et al. | |
| 6,191,588 B1 | 2/2001 | Chen | |
| 6,359,438 B1 | 3/2002 | Bittar | |
| 6,373,254 B1 | 4/2002 | Dion et al. | |
| 6,600,321 B2 | 7/2003 | Evans | |
| 6,714,014 B2 | 3/2004 | Evans et al. | |
| 6,891,377 B2 | 5/2005 | Cheung et al. | |
| 7,046,010 B2 | 5/2006 | Hu et al. | |
| 7,066,282 B2 | 6/2006 | Chen et al. | |
| 7,098,664 B2 * | 8/2006 | Bittar et al. | 324/367 |
| 7,242,194 B2 | 7/2007 | Hayman et al. | |
| 7,250,768 B2 | 7/2007 | Ritter et al. | |
| 7,265,553 B2 | 9/2007 | Cheung et al. | |
| 7,284,605 B2 | 10/2007 | Clark et al. | |
| 8,030,937 B2 * | 10/2011 | Hu et al. | 324/366 |
| 8,098,071 B2 * | 1/2012 | Tabarovsky | 324/367 |
| 8,136,591 B2 * | 3/2012 | Del Campo et al. | 166/254.2 |
| 2003/0155925 A1 * | 8/2003 | Tabarovsky et al. | 324/374 |
| 2007/0103161 A1 * | 5/2007 | San Martin et al. | 324/366 |
| 2008/0315884 A1 * | 12/2008 | Bittar et al. | 324/366 |
| 2009/0085570 A1 | 4/2009 | Signorelli et al. | |
| 2009/0224766 A1 * | 9/2009 | Wang et al. | 324/366 |

* cited by examiner

*Primary Examiner* — Joshua Benitez Rosario
(74) *Attorney, Agent, or Firm* — Darla P. Fonseca (57) ABSTRACT

Methods for making calibrated microresistivity logging measurements in nonconductive drilling fluid are disclosed. A calibrated measurement parameter (e.g., a calibrated electrical impedance or a calibrated potential difference) is obtained and further utilized to compute a formation resistivity. The methods tend to be particularly well suited for drilling applications in which the borehole environment is highly resistive (i.e., boreholes in which both the drilling fluid and the formation have a high resistivity).

16 Claims, 5 Drawing Sheets

FIG. 7B ly, embodiments of this invention relate to calibration
CALIBRATION METHOD FOR A MICRORESISTIVITY LOGGING TOOL

RELATED APPLICATIONS

None.

FIELD OF THE INVENTION

The present invention relates generally to methods for making microresistivity logging measurements. More particularly, embodiments of this invention relate to calibration methods for microresistivity logging in nonconductive (oil based) drilling fluid.

BACKGROUND OF THE INVENTION

The use of electrical measurements in prior art downhole applications, such as logging while drilling (LWD) and wireline logging applications, is well known. Such techniques may be utilized to determine a subterranean formation resistivity, which, along with formation porosity measurements, may be used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Techniques for making microresistivity measurements of a subterranean formation are well known in the prior art for both wireline and LWD operations. For example, a conventional "four terminal" sensor configuration includes at least four electrodes: including at least one pair of spaced potential electrodes deployed between current injector and current return electrodes. In use, an alternating current is passed between the injector and return electrodes and a corresponding potential drop is measured between the potential electrodes. The potential drop tends to be approximately proportional to the resistivity of the formation opposing the potential electrodes for a given injected current. U.S. Pat. No. 6,191,588 to Chen discloses one example of a four terminal sensor configuration.

Those of skill in the art will understand that oil based (nonconductive) drilling fluid is commonly utilized when drilling through water soluble formations (e.g., including salt layers). Microresistivity logging in such nonconductive drilling fluid typically requires the use of high frequency alternating currents and voltages so as to reduce the electrical impedance of the oil based drilling fluid and enable a portion of the current to penetrate the formation. The use of high frequencies is also known to cause displacement currents in dielectric materials in the microresistivity sensor and in the non-conductive drilling fluid (those of skill in the art will appreciate that the electrical impedance of these dielectrics decreases with increasing frequency). These displacement currents exist even without any formation around the sensor, i.e., with the sensor in air or vacuum. In a subterranean borehole, the displacement currents create spurious potential drops across the potential electrodes that are not related to the formation resistivity. The displacement currents therefore tend to reduce the sensitivity of the sensor to changes in formation resistivity, particularly in highly resistive formations in which the formation signal tends to be weak. The displacement currents also tend to introduce an absolute error into the measured formation resistivity. As such, there is a need in the art for improved methods for making microresistivity measurements. In particular, there is a need for high-frequency measurement methods that account for the presence of the aforementioned displacement currents.

SUMMARY OF THE INVENTION

Aspects of the present invention are intended to address the above described need for microresistivity logging tools having improved sensors. Exemplary embodiments of the present invention include methods for making calibrated microresistivity logging measurements in nonconductive drilling fluid using conventional four terminal microresistivity sensor configurations. In these methods, a calibrated measurement parameter (e.g., a calibrated electrical impedance or a calibrated potential difference) is obtained and further utilized to compute a formation resistivity.

Exemplary embodiments of the present invention may advantageously provide several technical advantages. For example, methods in accordance with the present invention account for displacement currents in the microresistivity sensor and in the drilling fluid and therefore tend to improve the accuracy of and the sensitivity to the formation resistivity. The invention tends to be particularly advantageous in highly resistive borehole environments, i.e., boreholes in which both the drilling fluid and the formation have a high resistivity.

Furthermore, in exemplary embodiments of the invention, the microresistivity sensor measurements may be calibrated using a fluid with the same or similar electrical properties to drilling mud. The effects of the drilling fluid and the sensor body on the computed formation resistivity measurement tend to be maximally reduced in such embodiments. Moreover, the calibration measurements may be made under similar temperature and pressure conditions to a downhole environment to provide a further enhanced calibration.

In one aspect the present invention includes a method for making calibrated microresistivity logging measurements. A microresistivity logging tool is deployed in a nonconductive medium. The tool includes a current injection electrode configured to inject electrical current into a formation, a return electrode spaced apart from the current injection electrode and providing a return path for the electrical current, and at least first and second spaced potential electrodes. A first alternating current is applied between the current injection electrode and the return electrode and a first AC potential difference is measured between the first and second potential electrodes. The tool is then redeployed in a subterranean borehole including a nonconductive drilling fluid where a second alternating current is applied between the current injection electrode and the return electrode and a second AC potential difference is measured between the first and second potential electrodes. A first parameter derived from the first AC potential difference measured in (c) is subtracted from a second parameter derived from the second AC potential difference measured in (f) to obtain a calibrated impedance. A formation resistivity is then computed from the calibrated impedance.

In another aspect, the present invention includes a method for making calibrated microresistivity logging measurements. The method includes deploying a microresistivity logging tool in a nonconductive medium. The tool includes a current injection electrode configured to inject electrical current into a formation, a return electrode spaced apart from the current injection electrode and providing a return path for the electrical current, and at least first, second, and third spaced potential electrodes. An alternating current is applied between the current injection electrode and the return electrode and a first AC potential difference is measured between the first and second potential electrodes and a second AC potential difference is measured between the second and third potential electrodes. A ratio of the first and second AC potential differences is then computed. The tool is then redeployed in a subterranean borehole including a nonconductive drilling fluid. An alternating current is again applied between the current injection electrode and the return electrode and AC potential differenced measured between the first and second potential electrodes and the second and third potential electrodes. The ratio is then applied to the AC potential differences measured downhole to obtain a calibrated potential difference which is in turn used to compute a formation resistivity.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Referring now to FIGS. 1 through 7, exemplary embodiments of the present invention are depicted. With respect to FIGS. 1 through 7, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 7 may be described herein with respect to that reference numeral shown on other views.

Figure 1:
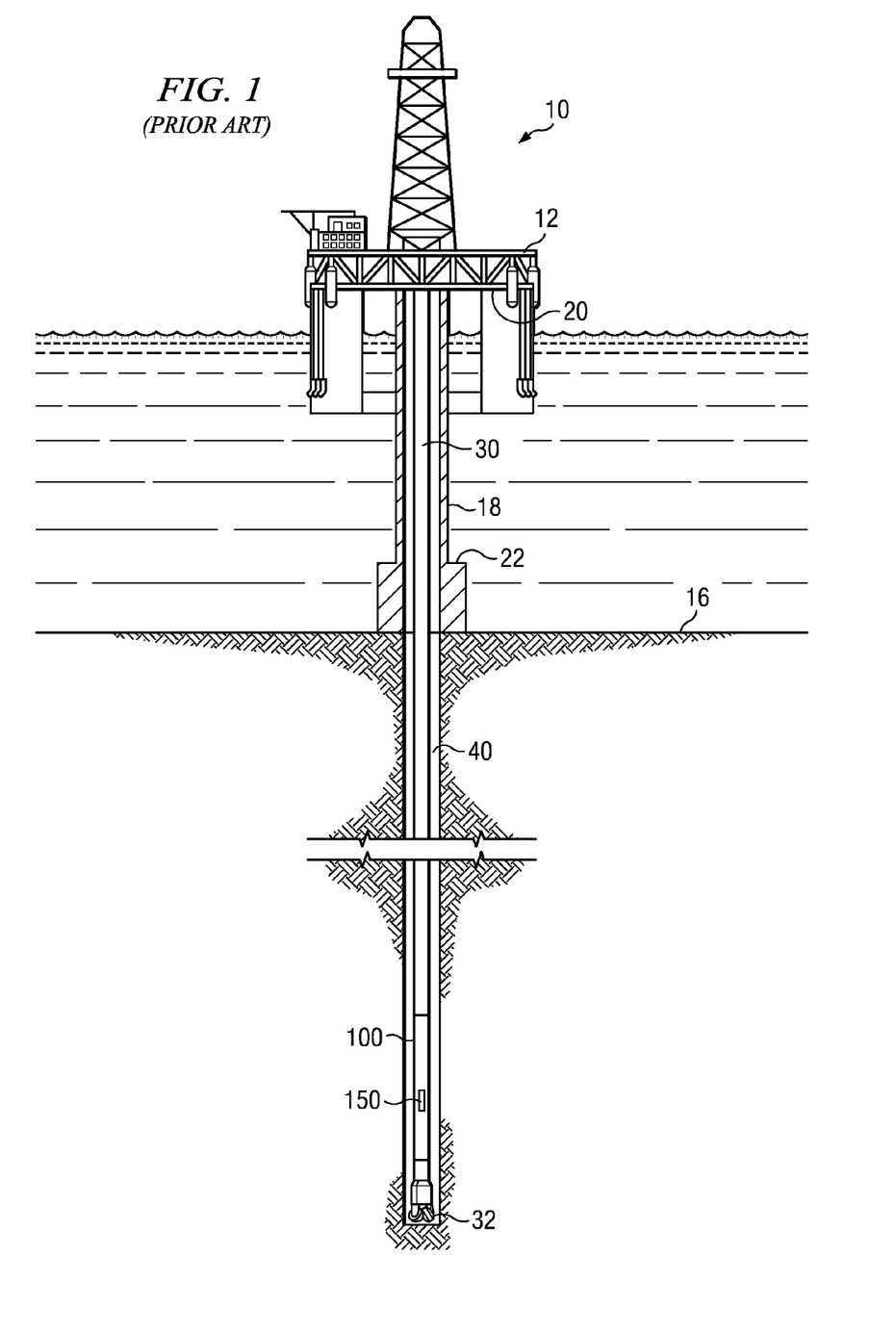
FIG. 1 depicts a conventional drilling rig on which exemplary embodiments of the present invention may be utilized.

FIG. 1 depicts one exemplary embodiment of a microresistivity logging while drilling tool 100 in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100 having at least one microresistivity sensor 150. Drill string 30 may further include, for example, a downhole drill motor, a mud pulse telemetry system, a steering tool, and/or one or more of numerous other MWD and LWD sensors for sensing downhole characteristics of the borehole and the surrounding formation.

It will be understood by those of ordinary skill in the art that the deployment depicted on FIG. 1 is merely exemplary for purposes of describing the invention set forth herein. It will be further understood that methods in accordance with the present invention are not limited to use with a semisubmersible platform 12 as illustrated on FIG. 1. The inventive methods are equally well suited for use with any kind of subterranean drilling operation, either offshore or onshore. While measurement tool 100 is shown coupled with drill string 30 on FIG. 1, it will also be understood that the invention is not limited to LWD embodiments, but may also be utilized in wireline operations.

LWD tool 100 may optionally further include an azimuth sensor (not shown) configured to measure the azimuth angle (toolface angle) of the microresistivity sensor 150 in substantially real time during drilling. Suitable azimuth sensors typically include one or more accelerometers, magnetometers, and/or gyroscopes and are well known in the art. It will be understood that the invention is not limited to any particular azimuth sensor configuration or even to the use of an azimuth sensor.

Figure 2A:
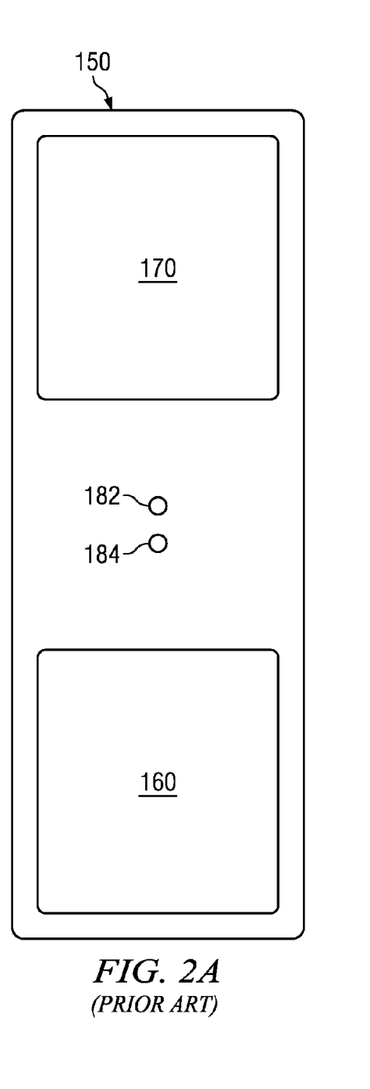
FIGS. 2A and 2B (collectively FIG. 2) depict one exemplary embodiment of a microresistivity sensor suitable for use with the present invention.

FIG. 2A depicts a prior art microresistivity sensor embodiment 150 that is suitable for use with the present invention. Sensor 150 includes a conventional four terminal configuration including first and second potential electrodes 182 and 184 deployed between a current injection electrode 160 and a return electrode 170. In use an alternating electrical current is applied between the current injection 160 and return 170 electrodes. The measured potential difference between the potential electrodes 182 and 184 is commonly used to evaluate the formation resistivity.

It will be understood that the invention is not limited to the use of sensor embodiments including a dipole current injection electrode such as depicted on FIG. 2A. The invention may also make use of microresistivity sensor embodiments including a monopole current injection electrode. Sensor embodiments including a monopole current injection electrode are disclosed in commonly assigned and invented, co-pending U.S. patent application Ser. No. 12/649,885 (now U.S. Patent Publication 2011/0156711) and commonly assigned, co-pending U.S. patent application Ser. No. 12/649,930 (now U.S. Patent Publication 2011/0156709).

As described above in the Background section, microresistivity logging measurements made in nonconductive drilling fluid typically utilize high frequency alternating currents and/or voltages (e.g., in the frequency range from about 0.1 to about 10 MHz). While the use of a high frequency current or voltage source tends to capacitively couple the sensor with the formation, thereby resulting in a measurable formation current $I_F$, the use of high frequencies also tends to cause displacement currents in the sensor (and tool) $I_T$ and in the non-conductive drilling fluid (mud) $I_M$. These displacement currents are depicted schematically in FIG. 2B. They depend primarily on the resistivity and dielectric constant of the sensor body and drilling fluid respectively and therefore may be considered to be spurious in the sense that they contain essentially no information about the formation resistivity.

Figure 2B:
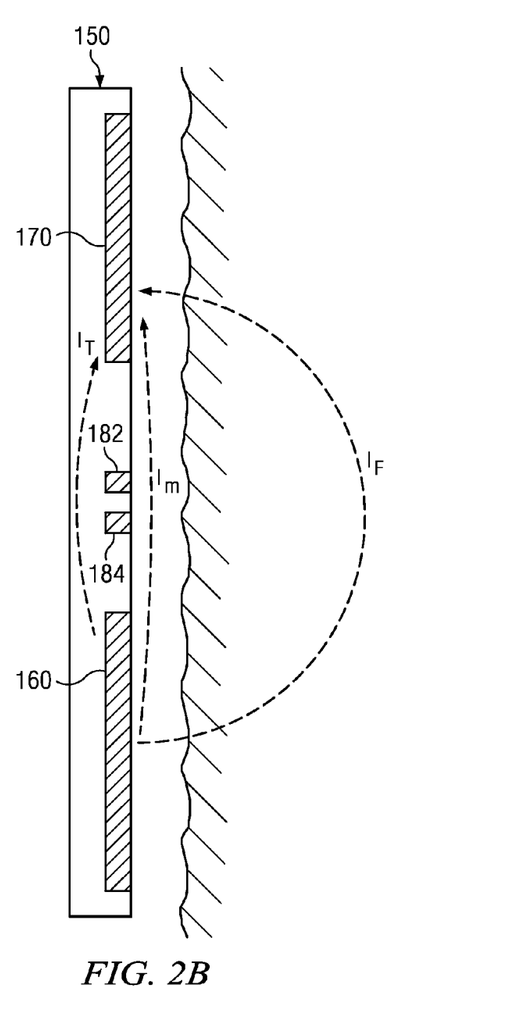
Figure 3:
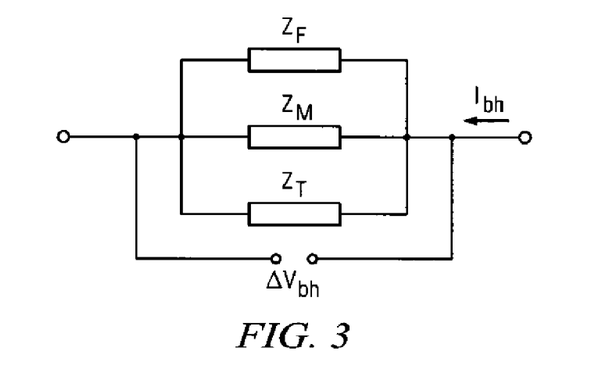
FIG. 3 depicts an electrical equivalent circuit of the microresistivity sensor deployment depicted on FIG. 2B.

FIG. 3 depicts an electrical equivalent circuit of the configuration depicted on FIG. 2B (deployment of a four terminal microresistivity sensor in a fluid filled borehole). In this circuit diagram, the electrical impedances of the formation $Z_F$, the drilling fluid (or mud) $Z_M$, and the sensor body (or tool body) $Z_T$ are depicted as being in parallel with one another. The total applied current at the injection electrode $I_{bh}$ may therefore be represented as a mathematical sum of the current in the formation $I_F$, the current in the drilling mud $I_M$, and the current in the sensor body $I_T$, for example, as follows:

$$I_{bh} = I_F + I_M + I_T = \frac{\Delta V_{bh}}{Z_F} + \frac{\Delta V_{bh}}{Z_M} + \frac{\Delta V_{bh}}{Z_T} \qquad \text{Equation 1}$$

Equation 1 also shows that a potential difference measured across the first and second potential electrodes $\Delta V_{bh}$ is proportional to the total current in the injection electrode $I_{bh}$, with the proportionality constant being related to the sum of the inverse of the impedances depicted on FIG. 3 (i.e., the sum of the admittances).

It will be appreciated by those of ordinary skill in the art that the local formation impedance $Z_F$ is proportional to the local formation resistivity. The mud and sensor body impedances $Z_M$ and $Z_T$ contain essentially no information about the formation resistivity. As such, displacement currents in the mud column or sensor body are essentially parasitic and tend to cause a bias to the formation resistivity when left unaccounted. One objective of the present invention is to provide a calibration method that removes or reduces the influence of the mud and/or tool impedances on the measured formation resistivity.

Figure 4:
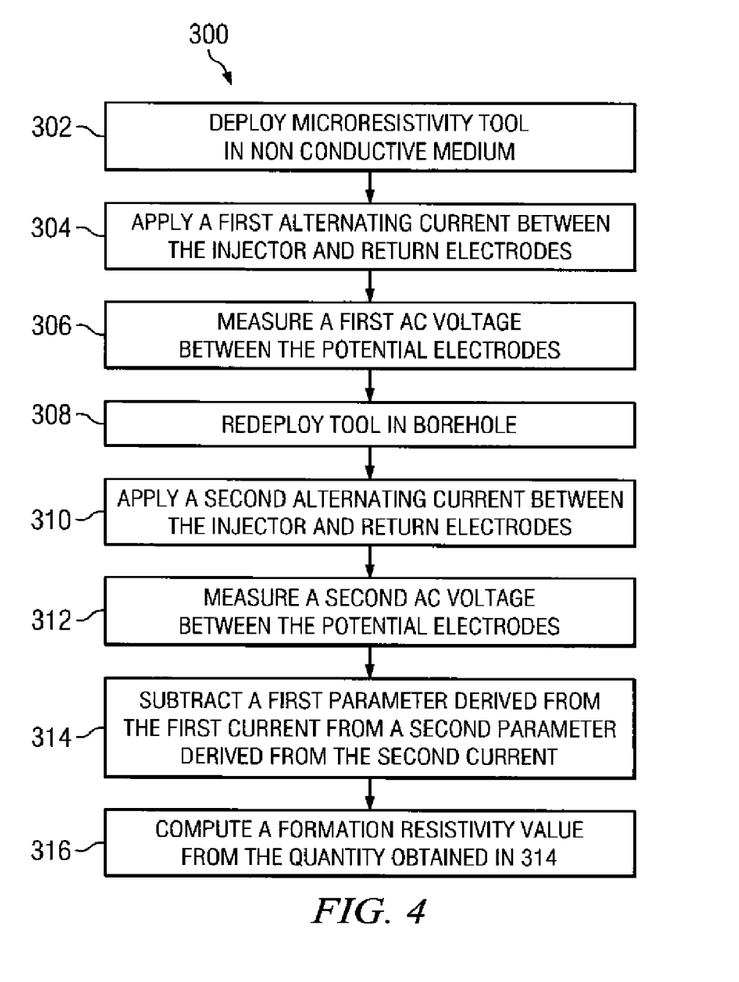
FIG. 4 depicts a flow chart of one exemplary method embodiment in accordance with the present invention.

Turning now to FIG. 4, a flow chart of one exemplary method embodiment 300 in accordance with the present invention is depicted. Method 300 may be thought of as a method for calibrating a four terminal sensor (e.g., sensor 150 depicted on FIGS. 2A and 2B) to accommodate the above described displacement currents. Method 300 is therefore described with further reference to FIGS. 2A and 2B, however, it will be understood that the invention is in no way limited to the rudimentary four terminal sensor embodiment depicted therein.

At 302 a microresistivity logging tool is deployed in a nonconductive medium, such as air. In one exemplary embodiment the logging tool includes a logging sensor including at least first and second potential electrodes deployed between at least one current injection electrode and at least one return electrode (e.g., as depicted on FIGS. 2A and 2B). At 304 a first high frequency alternating current is applied between the current injection electrode 260 and the return electrode 270. The alternating current is preferably in a frequency range from about 0.1 to about 10 MHz. At 306 a first potential difference (an AC voltage) is measured between the potential electrodes 282 and 284.

At 308 the logging tool is redeployed in a subterranean borehole including an oil based (nonconductive) drilling fluid. At 310 a second high frequency alternating current is applied between the current injection and return electrodes. In one exemplary embodiment the second current has the same amplitude as the first current applied in 304, however, the invention is by no means limited in this regard. The first and second alternating currents need not be equal. At 312 a corresponding second potential difference is measured between the first and second potential electrodes. At 314 a first parameter derived from the first alternating current applied at 304 is subtracted from a second parameter derived from the second alternating current applied at 310 to obtain a calibrated electrical impedance. At 316 a formation resistivity value may be computed using the calibrated impedance value obtained at 314.

Figure 5:
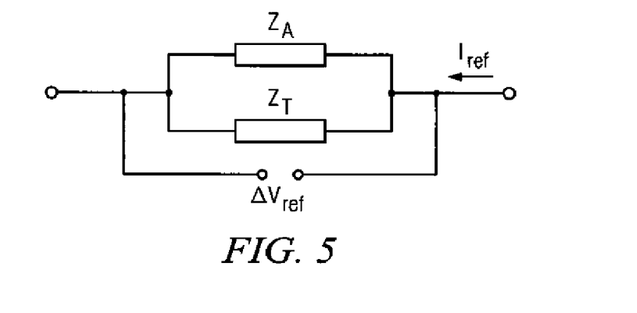
FIG. 5 depicts an electrical equivalent circuit of an air deployment of the microresistivity sensor depicted on FIG. 2A.

With reference continued reference to FIG. 4 and further reference now to FIG. 5, an electrical circuit diagram is depicted of the sensor when deployed in the nonconductive medium at 302. In the exemplary embodiment depicted on FIG. 5, the sensor is assumed to be deployed in air, although the invention is not limited in this regard. In this circuit diagram, the electrical impedance of the sensor body $Z_T$ is depicted as being in parallel with an electrical impedance of the non conductive medium (e.g., the impedance of air $Z_A$). The total applied current at the injection electrode $I_{ref}$ may therefore be represented as a mathematical sum of the displacement current in the sensor body $I_T$ and the displacement current in the nonconductive medium $I_A$, for example, as follows:

$$I_{ref} = I_T + I_A = \frac{\Delta V_{ref}}{Z_T} + \frac{\Delta V_{ref}}{Z_A} \qquad \text{Equation 2}$$

Equation 2 also shows that a potential difference measured across the first and second potential electrodes $\Delta V_{ref}$ (e.g., as measured at 306) is proportional to the total current in the injection electrode $I_{ref}$, with the proportionality constant being related to the sum of the inverse of the impedances depicted on FIG. 5 (i.e., the sum of the admittances).

With continued reference to FIG. 4, step 314 may be represented mathematically, for example, as follows:

$$\frac{1}{Z_{cal}} = \frac{I_{bh}}{\Delta V_{bh}} - \frac{I_{ref}}{\Delta V_{ref}} = \frac{1}{Z_F} + \frac{1}{Z_M} - \frac{1}{Z_A} \qquad \text{Equation 3}$$

where $Z_{cal}$ represents the calibrated impedance and $I_{bh}$, $I_{ref}$, $\Delta V_{bh}$, $\Delta V_{ref}$, $Z_F$, $Z_M$, and $Z_A$ are as defined above with respect to Equations 1 and 2. Equation 3 indicates that calibration method 300 advantageously removes the sensor body impedance $Z_T$ from the measured impedance. The impedance of the drilling fluid $Z_M$ has been at least partially removed (or reduced) since oil-based drilling fluid and air have similar electrical properties (i.e., similarly high resistivity values at the perturbation frequencies of interest). Since $Z_M$ and $Z_A$ are not typically identical and since the volume of the annular mud column in the borehole is less than that of free space, the impedance of the drilling fluid is not typically fully removed when the nonconductive medium is air. To more fully remove the drilling fluid impedance the sensor may be deployed at 302, for example, in a fluid with the same or similar electrical properties to drilling mud. Moreover, the calibration may be made at similar temperatures and pressures to those observed downhole so as to further account for the drilling fluid and sensor body impedances.

A formation resistivity may then be estimated from the calibrated impedance obtained at 314, for example, as follows:

$$R = k\, Re(Z_{cal}) \quad \text{Equation 4}$$

where R represents the formation resistivity, k represents a geometrical scaling factor, and Re stands for the real part of a complex quantity.

Figure 6:
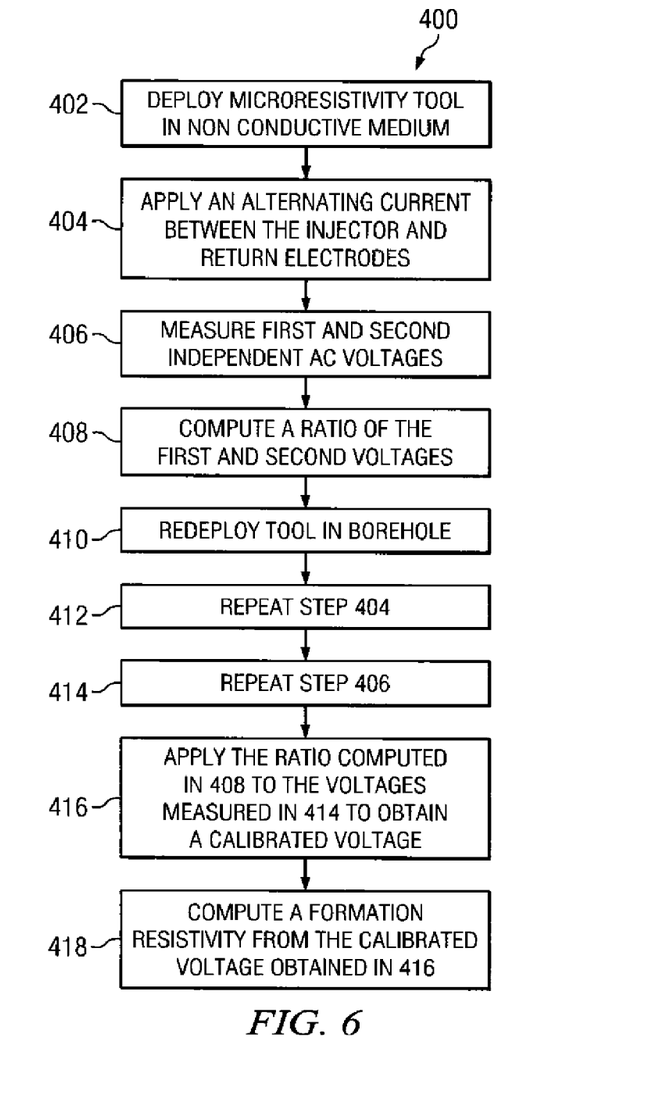
FIG. 6 depicts a flow chart of another exemplary method embodiment in accordance with the present invention.

FIG. 6 depicts a flow chart of another exemplary method embodiment 400 in accordance with the present invention. Method 400 may be thought of as another calibration method for calibrating a four terminal sensor so as to accommodate the above described displacement currents. Method 400 is configured for use with sensor embodiments including at least first, second, and third potential electrodes, for example, exemplary sensor embodiments 250 and 250' depicted on FIGS. 7A and 7B (which are described in more detail below). Method 400 is therefore described with further reference to FIGS. 7A and 7B, however, it will be understood that the invention is in no way limited to the rudimentary sensor embodiments depicted therein.

In the method embodiment depicted on FIG. 6 a microresistivity logging tool is deployed in a nonconductive medium such as air at 402. The tool includes a sensor having at least first, second, and third potential electrodes deployed between at least one current injection electrode and at least one return electrode. At 404 a high frequency alternating current is applied between the current injection electrode 260 and the return electrode 270. As described above with respect to FIG. 2B, the alternating current is preferably in a frequency range from about 0.1 to about 10 MHz. At 406 first and second independent AC voltages are measured between corresponding first and second pairs of potential electrodes, for example, between electrodes 282 and 284 and between electrodes 284 and 286 in FIG. 7A. Those of ordinary skill in the art will appreciate that the first and second voltages may also be measured between electrodes 282 and 284 and electrodes 282 and 286 or between electrodes 282 and 286 and electrodes 284 and 286. The invention is not limited in these regards. At 408 a scaling factor between the first and second AC voltages is computed.

The microresistivity tool may then be redeployed in a borehole including an oil based (non conductive) drilling fluid at 410. At 412 and 414, steps 404 and 406 may be repeated. At 416 the ratio computed in 408 is applied to the first and second AC voltages measured in 414 to obtain a calibrated voltage. The calibrated voltage may then be used at 418 to compute a formation resistivity.

With continued reference to FIG. 6, step 408 may be represented mathematically, for example, as follows:

$$\alpha = \frac{\Delta V_{ref,2}}{\Delta V_{ref,1}} \quad \text{Equation 5}$$

where $\alpha$ represents the scaling factor (or ratio) and $\Delta V_{ref,1}$ and $\Delta V_{ref,2}$ represent the first and second AC voltages measured in 406. The scaling factor may then be applied to the AC voltages measured at 416, for example, as follows:

$$\frac{1}{\Delta V_{cal}} = \frac{1}{\Delta V_{bh,1}} - \frac{\alpha}{\Delta V_{bh,2}} \quad \text{Equation 6}$$

where $\Delta V_{cal}$ represents the calibrated AC voltage (or potential difference) obtained in 416, and $\Delta V_{bh,1}$ and $\Delta V_{bh,2}$ represent the first and second AC voltages measured in 414 with the tool deployed in the subterranean borehole. It will be understood that the terms AC voltage and AC potential difference are used synonymously herein. An apparent formation resistivity may then be estimated from the calibrated potential difference, as follows:

$$R = k\,\mathrm{Re}\!\left(\frac{\Delta V_{cal}}{I}\right) \quad \text{Equation 7}$$

where I is the injection current applied in 412, k represents a geometrical scaling factor, and Re stands for the real part of a quantity. The scaling factor k may be advantageously selected such that the calculated apparent resistivity is the same as the true formation resistivity in the presence of a borehole.

The inventive methods described above are intended to provide improved measured accuracy and sensitivity in the presence of oil based mud. The advantages of these methods may be easily understood when the borehole environment is highly resistive, i.e., when both the drilling fluid and the formation have a high resistivity. To better illustrate, a hypothetical borehole environment is considered in which the drilling fluid and the formation are assumed to have electrical properties (resistivity and dielectric constant) equal to that of air. In the absence of calibration, the measured admittance (i.e., $I_{bh}/\Delta V_{bh}$, which is the mathematical inverse of the impedance) equals the sum of the admittances of the formation, the drilling fluid, and the sensor body (see Equation 1). In a typical borehole environment the admittance of the formation is approximately equal to the inverse of the formation resistance at the measurement frequencies used (e.g., at frequencies less than about 1 GHz). This approximate equality may be expressed mathematically, for example, as follows:

$$\frac{1}{Z_F} \approx \frac{1}{R_F} \quad \text{Equation 8}$$

where $R_F$ is the formation resistance. On the other hand, the sensor body is commonly fabricated from a dielectric material having both a high resistivity and a high dielectric constant. Owing to the high dielectric constant of the sensor body, the resistance of the sensor body may be neglected. The admittance of the sensor body may then be represented mathematically, for example, as follows:

$$\frac{1}{Z_T} \approx j\omega C_T \quad \text{Equation 9}$$

where $j = \sqrt{-1}$, $\omega$ is angular frequency (in units of radians/sec), and $C_T$ is the capacitance of the sensor body. Neglecting any contribution from the borehole fluid, the measured admittance may be represented as the sum of the admittances of the formation and the sensor body. A measured impedance may then be derived from the measured admittance and expressed, for example, as follows:

$$Z_{bh} \approx \frac{R_F}{1+(\omega R_F C_T)^2} - j\frac{\omega R_F C_T}{1+(\omega R_F C_T)^2} \quad \text{Equation 10}$$

where $Z_{bh}$ is the measured impedance. Those of ordinary skill in the art will appreciate that the formation resistance (and therefore the formation resistivity) is not readily derivable from the real part of the measured impedance since it also contains a contribution from the capacitance of the sensor body. The above described calibration methods remove the influence of sensor body capacitance on the measured formation resistivity and therefore enable the formation resistance to be readily obtained.

With respect to method 300 (FIG. 4), Equation 3 indicates that the calibrated impedance approaches that of the formation when the impedance of the drilling fluid approaches that of air (i.e., $Z_{cal}=Z_F$ when $Z_M=Z_A$). With respect to method 400, the above described hypothetical borehole environment results in a calibrated resistivity approaching infinity (i.e., that of air). In particular, with respect to Equations 5 and 6, $\Delta V_{ref,1}=\Delta V_{air,1}$, $\Delta V_{ref,2}=\Delta V_{air,2}$, $\Delta V_{bh,1}=\Delta V_{air,1}$, and $\Delta V_{bh,2}=\Delta V_{air,2}$ in the hypothetical borehole where $\Delta V_{air,1}$ and $\Delta V_{air,2}$ are the first and second AC voltages measured in air. It then follows from Equations 6 and 7 that $R \rightarrow \infty$ since $1/\Delta V_{cal} \rightarrow 0$.

Figure 7A:
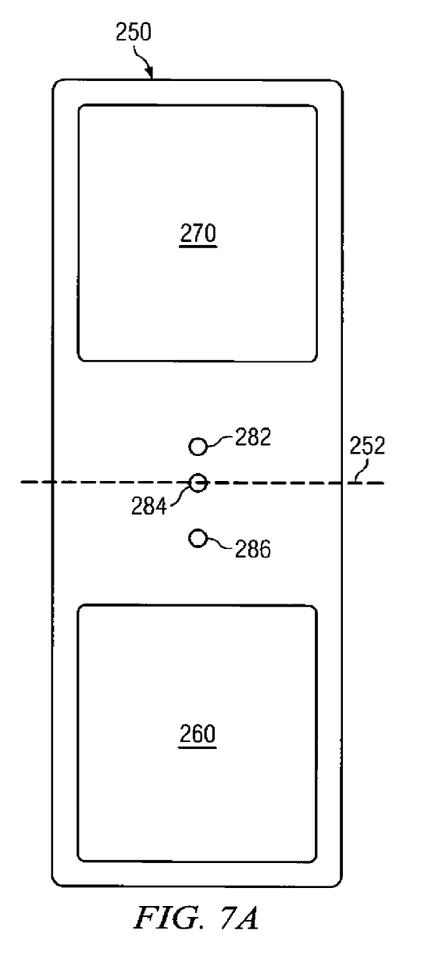
FIGS. 7A and 7B (collectively FIG. 7) depict exemplary microresistivity sensor embodiments suitable for use with exemplary method embodiments in accordance with the present invention (e.g., the method embodiment depicted on FIG. 6).
Figure 7B:
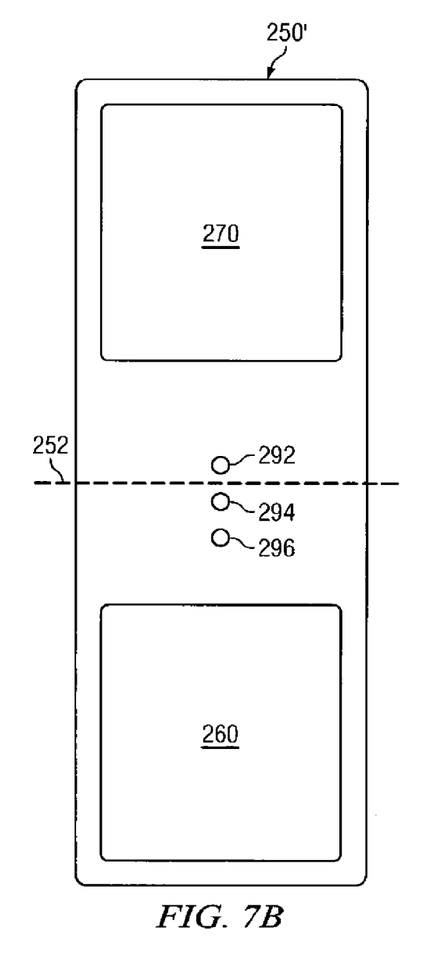

FIGS. 7A and 7B depict first and second exemplary sensor embodiments 250 and 250' suitable for use with method 400. Sensor embodiments 250 and 250' each include current injection 260 and current return 270 electrodes. These sensor embodiments 250 and 250' further include first, second, and third potential electrodes deployed between the injection 260 and return 270 electrodes. In order to prevent the calibrated potential from being equal to or nearly equal to zero in a formation having uniform electrical properties, the first, second, and third electrodes are preferably unequally spaced and/or asymmetrically deployed between the current injection 260 and return 270 electrodes.

Sensor embodiment 250 (FIG. 7A) includes first, second, and third asymmetrically spaced potential electrodes 282, 284, and 286. While potential electrode 284 is located at the midpoint 252 between the current injection 260 and return 270 electrodes, the first and second electrodes 282 and 284 are more closely spaced than the second and third electrodes 284 and 286. Sensor embodiment 250' (FIG. 7B) also includes first, second, and third asymmetrically spaced potential electrodes 292, 294, and 296. While these electrodes are equally spaced with respect to one another, they are located off-center between the injection 260 and returned 270 electrodes (such that the second electrode 294 is not located at the midpoint 252).

In the exemplary method embodiments 300 and 400 described above with respect to FIGS. 4 and 6, a reference measurement is made with the microresistivity tool deployed in a nonconductive medium. This medium may be air, for example. The medium may also include, for example, an artificial borehole environment located in a laboratory. Such an artificial borehole environment may include, for example, a nonconductive cylinder filled with a nonconductive drilling fluid. It will be understood that the invention is not limited to any particular nonconductive medium.

With reference again to FIG. 1, measurement tool 100 commonly includes an electronic controller. A suitable controller typically includes a programmable processor (not shown), such as a microprocessor or a microcontroller, and may also include processor-readable or computer-readable program code embodying logic, including instructions for controlling the function of the tool. A suitable controller may be utilized, for example, to make microresistivity measurements while drilling. As such the controller may further be configured to execute at least a portion of methods 300 and/or 400 depicted on FIGS. 4 and 6. For example, the controller may be configured to (i) inject an alternating current into a formation at the current injection electrode, (ii) measure a potential difference between the potential electrodes, (iii) compute calibrated measurement parameters (e.g., a calibrated impedance or a calibrated potential difference), and (iv) compute an apparent resistivity using calibrated measurement parameters.

A suitable controller may also be configured to construct LWD microresistivity images of the subterranean formation. In such imaging applications, the microresistivity measurements may be acquired and correlated with corresponding azimuth measurements while the tool rotates in the borehole. As such, the controller may therefore include instructions for temporally correlating LWD sensor measurements with sensor azimuth (toolface) measurements. The LWD sensor measurements may further be correlated with depth measurements. Borehole images may be constructed using substantially any known methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 to Haugland discloses a technique for constructing a borehole image in which sensor data is convolved with a one-dimensional window function. Commonly assigned U.S. Pat. No. 7,558,675 to Sugiura discloses an image constructing technique in which sensor data is probabilistically distributed in either one or two dimensions.

A suitable controller may also optionally include other controllable components, such as other sensors, data storage devices, power supplies, timers, and the like. As described above, the controller is disposed to be in electronic communication with the various sensors deployed in the drilling system. The controller may also optionally be disposed to communicate with other instruments in the drill string, such as telemetry systems that further communicate with the surface or a steering tool. Such communication can significantly enhance directional control while drilling, for example, by enabling measured and/or computed parameters to be transmitted to the surface. These parameters may be used, for example, to make steering decisions during drilling. A controller may further optionally include volatile or non-volatile memory or a data storage device for downhole storage of measured potentials, microresistivity values, and/or borehole images. The invention is not limited in any of these regards.

Although the present invention and its advantages have been described in detail, it should be understood that various changes, substitutions and alternations can be made herein without departing from the spirit and scope of the invention as defined by the appended claims.

I claim:

1. A method for making calibrated microresistivity logging measurements, the method comprising:
   (a) deploying a microresistivity logging tool in a nonconductive medium, the tool including (i) a current injection electrode configured to inject electrical current into a formation, (ii) a return electrode spaced apart from the current injection electrode, the return electrode providing a return path for the electrical current, and (iii) at least first and second spaced potential electrodes;
   (b) applying a first alternating current between the current injection electrode and the return electrode;
   (c) measuring a first AC potential difference between the first and second potential electrodes;
   (d) redeploying the logging tool in a subterranean borehole including a nonconductive drilling fluid;

(e) applying a second alternating current between the current injection electrode and the return electrode;
(f) measuring a second AC potential difference between the first and second potential electrodes;
(g) causing a processor to subtract a first parameter derived from the first AC potential difference measured in (c) from a second parameter derived from the second AC potential difference measured in (f) to obtain a calibrated impedance; and
(h) causing a processor to compute a formation resistivity from the calibrated impedance obtained in (g).

2. The method of claim 1, wherein the nonconductive medium is air.

3. The method of claim 1, wherein a frequency of the first alternating current is equal to a frequency of the second alternating current, the frequency being in a range from about 0.1 to about 10 MHz wherein the calibrated impedance is computed in (g) according to the following mathematical equation:

$$\frac{1}{Z_{cal}} = \frac{I_{bh}}{\Delta V_{bh}} - \frac{I_{ref}}{\Delta V_{ref}}$$

wherein $Z_{cal}$, represents the calibrated impedance, $I_{ref}$ represents the first alternating current applied in (b), $I_{bh}$ represents the second alternating current applied in (e), $\Delta V_{ref}$ represents the first AC potential difference measured in (c), and $\Delta V_{bh}$ represents the second AC potential difference measured in (f).

4. The method of claim 1, wherein the first alternating current and the second alternating current are equal to one another.

5. The method of claim 1 wherein:
the first parameter is obtained by causing a processor to compute a ratio between the first alternating current applied in (b) and the first AC potential difference measured in (c); and
the second parameter is obtained by causing a processor to compute a ratio between the second alternating current applied in (e) and the second AC potential difference measured in (f).

6. The method of claim 1, wherein the formation resistivity is computed in (h) according to the following mathematical equation:

$$R = k\, Re(Z_{cal})$$

wherein R represents the formation resistivity, $Re(Z_{cal})$ represents the real part of the calibrated impedance obtained in (g), and k represents a geometrical scaling factor.

7. A method for making calibrated microresistivity logging measurements, the method comprising:
(a) deploying a microresistivity logging tool in a nonconductive medium, the tool including (i) a current injection electrode configured to inject electrical current into a formation, (ii) a return electrode spaced apart from the current injection electrode, the return electrode providing a return path for the electrical current, and (iii) at least first, second, and third spaced potential electrodes;
(b) applying an alternating current between the current injection electrode and the return electrode;
(c) measuring a first AC potential difference between the first and second potential electrodes and a second AC potential difference between the second and third potential electrodes;
(d) causing a processor to compute a ratio of the first and second AC potential differences measured in (c);
(e) redeploying the logging tool in a subterranean borehole including a nonconductive drilling fluid;
(f) repeating (b) and (c);
(g) causing a processor to apply the ratio computed in (d) to the first and second potential differences measured in (f) to obtain a calibrated potential difference; and
(h) causing a processor to compute a formation resistivity from the calibrated potential difference obtained in (g) wherein the ratio is computed in (d) according to the following mathematical equation:

$$\alpha = \frac{\Delta V_{ref,2}}{\Delta V_{ref,1}}$$

wherein $\alpha$ represents the ration and $\Delta V_{ref,1}$/and $\Delta V_{ref,2}$ represent the first and second AC potential differences measured in (c).

8. The method of claim 7, wherein the nonconductive medium comprises air.

9. The method of claim 7, wherein the alternating current applied in (b) and (f) has a frequency in a range from about 0.1 to about 10 MHz.

10. The method of claim 7, wherein the calibrated potential difference is computed in (g) according to the following mathematical equation:

$$\frac{1}{\Delta V_{cal}} = \frac{1}{\Delta V_{bh,1}} - \frac{\alpha}{\Delta V_{bh,2}}$$

wherein $\Delta V_{cal}$ represents the calibrated potential difference, $\Delta V_{bh,1}$ and $\Delta V_{bh,2}$ represent the first and second potential differences measured in (f), and $\alpha$ represents the ratio computed in (d).

11. The method of claim 7, wherein the formation resistivity is computed in (h) according to the following mathematical equation:

$$R = k\, Re\left(\frac{\Delta V_{cal}}{I}\right)$$

wherein R represents the formation resistivity, $Re(\Delta V_{cal})$ represents the real part of the calibrated potential difference obtained in (g), I represents the alternating current applied (f), and k represents a geometrical scaling factor.

12. The method of claim 7, wherein (i) the second electrode is deployed between the first electrode and the third electrode and (ii) a distance between the first electrode and the second electrode is less than a distance between the second electrode and the third electrode.

13. The method of claim 7, wherein (i) the second electrode is deployed between the first electrode and the third electrode and (ii) the second electrode is deployed off-center between the current injection electrode and the return to electrode.

14. A logging while drilling tool comprising:
a logging while drilling tool body;
a current injection electrode deployed in the tool body and configured to inject electrical current into a formation;
a return electrode spaced apart from the current injection electrode, the return electrode providing a return path for the electrical current;

at least first, second, and third potential electrodes deployed between the current injection electrode and the return electrode; and a controller configured to (i) apply an alternating current between the current injection electrode and the return electrode when the logging while drilling tool is deployed in a nonconductive medium; (ii) measure a first AC potential difference between the first and second potential electrodes and a second AC potential difference between the second and third potential electrodes; (iii) compute a ratio of the first and second AC potential differences measures in (ii); (iv) repeat (i) and (ii) when the logging while drilling tool is deployed in a subterranean borehole; (v) apply the ratio computed in (iii) to the first and second potential differences measured in (iv) to obtain a calibrated potential difference; and (vi) compute a formation resistivity from the calibrated potential difference obtained in (v).

15. The logging while drilling tool of claim 14, wherein the second electrode is deployed between the first electrode and the third electrode and a distance between the first electrode and the second electrode is less than a distance between the second electrode and the third electrode.

16. The logging while drilling tool of claim 14, wherein the second electrode is deployed between the first electrode and the third electrode and the second electrode is deployed off-center between the current injection electrode and the return to electrode.

* * * * *